(12) United States Patent
Carlson et al.

(10) Patent No.: US 9,943,047 B2
(45) Date of Patent: Apr. 17, 2018

(54) SYSTEM AND METHODS FOR PROVIDING REMOTE IRRIGATION SYSTEM OPERATION

(71) Applicant: Vivint, Inc., Provo, UT (US)

(72) Inventors: Richard Scott Carlson, Orem, UT (US); Thomas Colby Winegar, Draper, UT (US); Brian Brower, South Jordan, UT (US); Jeremy Bruce Warren, Draper, UT (US); Harrison Taylor Jenkins, Salt Lake City, UT (US); Alexander J. Dunn, Orem, UT (US); Michael Scott Moulton, Oakley, UT (US)

(73) Assignee: Vivint, Inc., Provo, UT (US)

( * ) Notice: Subject to any disclaimer, the term of this patent is extended or adjusted under 35 U.S.C. 154(b) by 310 days.

(21) Appl. No.: 14/961,402

(22) Filed: Dec. 7, 2015

(65) Prior Publication Data

US 2017/0156274 A1 Jun. 8, 2017

(51) Int. Cl.
*A01G 25/16* (2006.01)
*G05B 19/042* (2006.01)

(52) U.S. Cl.
CPC .......... *A01G 25/16* (2013.01); *G05B 19/042* (2013.01); *G05B 2219/2625* (2013.01)

(58) Field of Classification Search
None
See application file for complete search history.

(56) References Cited

U.S. PATENT DOCUMENTS

| 7,010,396 | B2 | 3/2006 | Ware et al. |
| 7,286,904 | B2 | 10/2007 | Graham |
| 8,649,907 | B2 | 2/2014 | Ersavas |
| 2013/0173070 | A1 | 7/2013 | Tennyson et al. |
| 2014/0129039 | A1 | 5/2014 | Olive-Chahinian et al. |

*Primary Examiner* — Carlos Ortiz Rodriguez
(74) *Attorney, Agent, or Firm* — Holland & Hart LLP

(57) ABSTRACT

The present disclosure relates systems and methods for providing remote irrigation system operation. In any embodiment, the method for a home automation system may include coupling an irrigation control bypass module with a legacy irrigation control panel associated with a legacy irrigation automation system. The method may also include setting the legacy irrigation control panel to an inactive state, and operating the legacy irrigation automation system based at least in part on a first set of one or more instructions received from the irrigation control bypass module. In any embodiment, the irrigation control bypass module may be initiated based at least in part on a second set of one or more instructions received from the home automation system.

20 Claims, 7 Drawing Sheets

SYSTEM AND METHODS FOR PROVIDING REMOTE IRRIGATION SYSTEM OPERATION

BACKGROUND

The present disclosure, for example, relates to home automation systems, and more particularly to providing remote irrigation system operation for existing irrigation systems using the home automation systems.

Home automation systems are widely deployed to provide various types of communication and functional features such as monitoring, communication, notification, and/or others. These systems may be capable of supporting communication with a user through a communication connection or a system management action.

Typical irrigation systems may be controlled at a local panel, usually positioned in the user's garage or yard. In most existing irrigation systems, these control panels must be interacted with directly in order to configure irrigation operation schedules, and therefore these systems may have limited operability. There is lacking a method by which these panels may be controlled remotely without the need to install an entirely new system.

SUMMARY

Existing irrigation control panels are often positioned in a user's garage or yard, and may require direct user interaction with the control panel in order to adjust irrigation system power, watering schedules, and other operating parameters. This need for direct user interaction with the panel may represent an inconvenience to users who are away from their homes but who still wish to actively monitor and adjust watering schedules for their irrigation systems. In order to address this issue, irrigation systems have been introduced that may allow for wireless or remote control, for example from a user's computer or smartphone using Wi-Fi or some other connection method with the irrigation system. While these systems may overcome issues of inconvenience for users installing new systems, they do not represent a complete solution. Users having existing irrigation systems requiring direct user interaction may not wish to install entirely new systems in order to have the convenience of remote operation, at least because of their existing monetary investment in the original system, and the cost and inconvenience of purchasing and installing a new system.

Accordingly, it may be desirable to provide an adaptor system by which an existing "legacy" irrigation controller system may be operated remotely by coupling an override or "bypass" controller to the legacy irrigation system control panel. The present system and methods provide this method for adaptation, by which the legacy system may be controlled without the need to install an entirely new irrigation system. In particular, the method may include coupling an irrigation control bypass module with a legacy irrigation control panel associated with a legacy irrigation automation system. The method may further include setting the legacy irrigation control panel to an inactive state, and operating the legacy irrigation automation system based at least in part on a first set of one or more instructions received from the irrigation control bypass module. In any embodiment, the irrigation control bypass module may be initiated based at least in part on a second set of one or more instructions received from the home automation system.

For example, a user having an existing legacy irrigation system, where the legacy irrigation system comprises a legacy irrigation control panel, may couple an irrigation control bypass module with the legacy panel by coupling a wire harness on the bypass module with the existing irrigation zone wires of the legacy panel. The user or home automation system may then turn the legacy irrigation control panel to an "off" position, or inactive state, such that signals from the legacy control panel do not interfere with signals from the bypass module. The bypass module may communicate wirelessly with a remote user computing system, such as a smartphone or personal computer, for example on a dedicated home automation system application. The user may input preferences regarding irrigation system operations at the dedicated application on his smartphone device, and the preferences may be communicated, for example via a Wi-Fi signal, to the bypass module, which may in turn control operations of the legacy irrigation system. For example, the user may input a command to activate the sprinkler system, or may input a watering schedule. These received instructions may then be used to operate the legacy irrigation system without input from the legacy irrigation control panel.

In some examples, the legacy irrigation control panel may remain in an "on," or active, state. The irrigation control bypass module may detect this operable state and may alert the user that the legacy irrigation control panel is active and is controlling operations of the legacy irrigation system. In other examples, where the irrigation control bypass module detects that the legacy irrigation control panel is in an active state, the bypass module may allow the legacy control panel signals to pass through and actively control the legacy irrigation system. In any example, the user may maintain the ability to interact directly with the legacy irrigation control panel, such that the legacy irrigation system may be operated either locally or remotely.

In some embodiments, the method described in the present disclosure may include setting the legacy irrigation control panel to an active state, and operating the irrigation automation system based at least in part on a third set of one or more instructions received from the legacy irrigation control panel. In some embodiments, this method may also include providing an alert to a user based at least in part on setting the legacy irrigation control panel to the active state. In further embodiments, this alert may include any of an auditory alert, a visual alert, or a haptic alert, or a combination thereof.

In some embodiments, the second set of one or more instructions received from the home automation system are derived based at least in part on any of a user input at the home automation system, or data received from one or more sensors associated with the home automation system, or a combination thereof. In some embodiments, the method described in the present disclosure may further include comparing the data received from the one or more sensors with one or more predetermined thresholds, and deriving the second set of one or more instructions based at least in part on the comparing. In further embodiments, the home automation system may be coupled with the irrigation control bypass module with a wireless connection.

In some embodiments, the one or more sensors may include any of a temperature sensor, a humidity sensor, a moisture sensor, or a light sensor, or a combination thereof.

In some embodiments, coupling the irrigation control bypass module with the legacy irrigation control panel associated with the legacy irrigation automation system includes coupling a wire harness associated with the irrigation control bypass module with one or more irrigation zone wires associated with the legacy irrigation control panel.

The present disclosure also provides an apparatus for a home automation system. In any embodiment, the apparatus may include a processor, a memory in electronic communication with the processor, and processor instructions stored in the memory. The processor instructions may be executable by the processor to set a legacy irrigation control panel associated with a legacy irrigation automation system to an inactive state. The processor instructions may further be executable by the processor to operate the legacy irrigation automation system based at least in part on a first set of one or more instructions received from an irrigation control bypass module. In any embodiment, the irrigation control bypass module may be coupled with the legacy irrigation control panel, and the irrigation control bypass module may be initiated based at least in part on a second set of one or more instructions received from the home automation system.

The present disclosure further provides a non-transitory computer-readable medium storing computer-executable code. In any embodiment, the code may be executable by the processor to set a legacy irrigation control panel associated with a legacy irrigation automation system to an inactive state. In any embodiment, the code may be further executable by the processor to operate the legacy irrigation automation system based at least in part on a first set of one or more instructions received from an irrigation control bypass module. In any embodiment, the irrigation control bypass module may be coupled with the legacy irrigation control panel, and the irrigation control bypass module may be initiated based at least in part on a second set of one or more instructions received from the home automation system.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

A system that allows for post hoc wireless control of an existing home irrigation system is provided below. While existing home irrigation systems may allow for wireless control and operation, there is lacking a method by which existing, manually operated home irrigation systems may be retrofitted to allow for remote control. This ability to retrofit an existing irrigation system may save users money and effort by avoiding the need to install an entirely new system, and may instead provide an easy and cost-effective method to update their existing systems.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
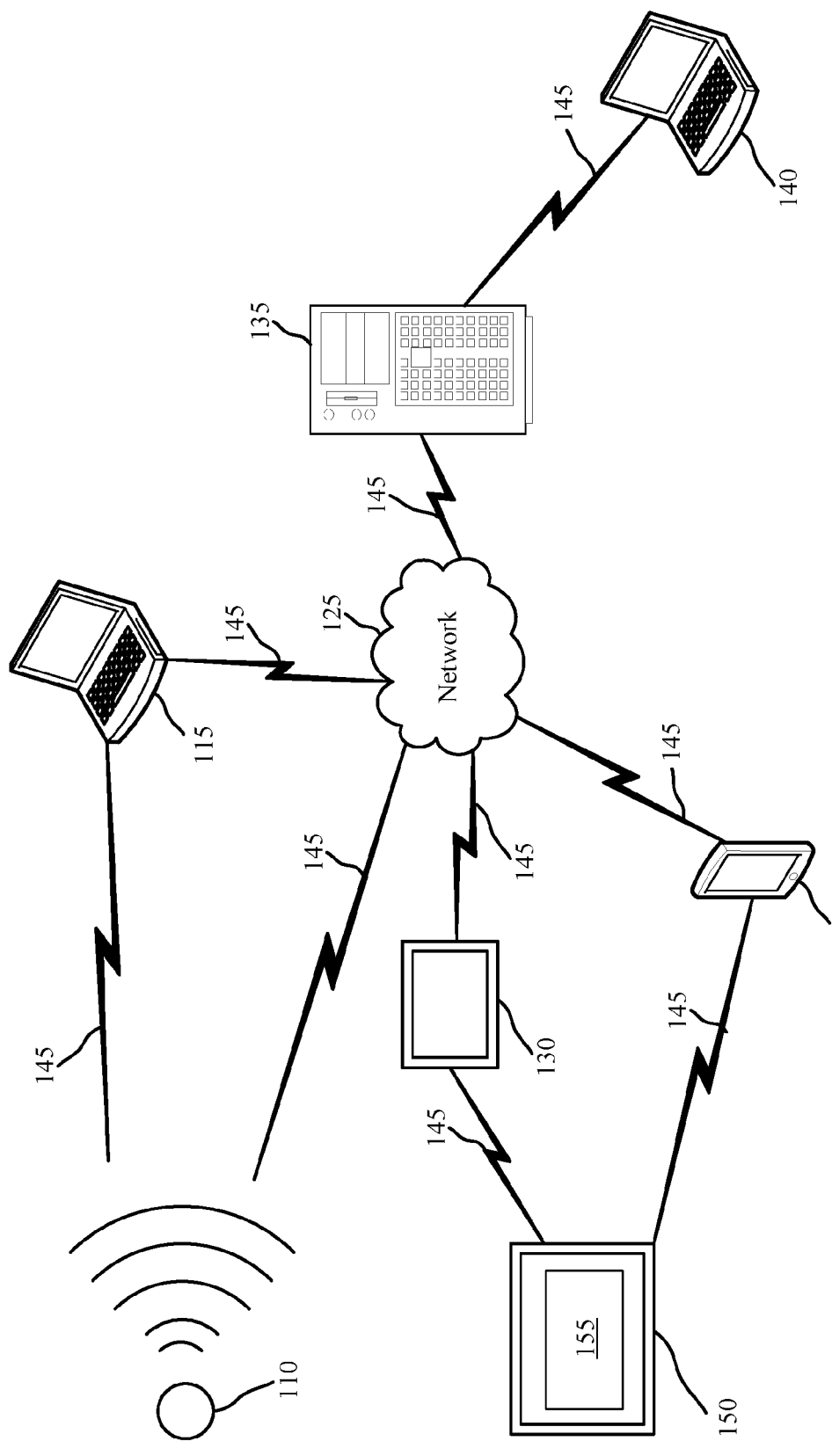
FIG. 1 shows a block diagram relating to an example of an automation system, in accordance with various aspects of this disclosure.

FIG. 1 is an example of an automation system 100 in accordance with various aspects of the disclosure. In some embodiments, the automation system 100 may include a legacy irrigation control panel 150 associated with a legacy irrigation automation system, an irrigation control bypass module 155 associated with the automation system 100, one or more sensor units 110, local computing device 115, 120, network 125, server 135, a control panel 130 associated with the automation system 100, and remote computing device 140. One or more sensor units 110 may communicate via wired or wireless communication links 145 with one or more of the local computing device 115, 120 or network 125. The network 125 may communicate via wired or wireless communication links 145 with the control panel 130 and the remote computing device 140 via server 135. Legacy irrigation control panel 150 may communicate with the control panel 130 and/or local computing devices 115, 120 via the irrigation control bypass module 155, where the irrigation control bypass module 155 utilizes wired or wireless communication links 145. In alternate embodiments, the network 125 may be integrated with any one of the local computing device 115, 120, server 135, or remote computing device 140, such that separate components are not required.

Local computing device 115, 120 and remote computing device 140 may be custom computing entities configured to interact with irrigation control bypass module 155 and sensor units 110 via network 125, and in some embodiments, via server 135. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA), and/or any other suitable device operable to send and receive signals, store and retrieve data, and/or execute modules.

Legacy irrigation control panel 150 may be an example of any analog or digital control panel associated with an existing or "legacy" irrigation automation system. This control panel 150 may be positioned, for example, in a garage or yard or a residence or other structure, and may be wired or wirelessly connected with one or more irrigation components, such that the control panel 150 may control and monitor irrigation operation and schedules. Irrigation control bypass module 155 may be wired or wirelessly coupled to legacy irrigation control panel 150 in order to control the operations of the legacy irrigation automation system. For example, in some embodiments, irrigation control bypass module 155 may include a wire harness having a plurality of wires, where each of the plurality of wires is associated with one or more irrigation zone wires coupled to or integrated with the legacy irrigation control panel 150. The wire harness of irrigation control bypass module 155 may accordingly be coupled with the one or more irrigation zone wires of the legacy irrigation control panel 150, such that irrigation control bypass module 155 may be in direct communication with the one or more irrigation zones of the legacy irrigation system. In other examples, irrigation control bypass module 155 may be wirelessly coupled with legacy irrigation control panel 150 and/or with the one or more irrigation zones of the legacy irrigation system.

Control panel 130 may be a smart home system panel, for example, an interactive panel mounted on a wall in a user's home. Control panel 130 may be in direct communication via wired or wireless communication links 145 with irrigation control bypass module 155, or may be in indirect communication with irrigation control bypass module 155 via local computing devices 115, 120 and network 125, or may be in indirect communication with irrigation control bypass module 155 via remote computing device 140, server 135, and network 125. Control panel 130 may also be configured to receive, directly or indirectly, data from one or more sensor units 110, for example via direct communication links 145, or via local computing devices 115, 120 and/or network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, controlling operation of the legacy irrigation system via irrigation control bypass module 155.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™(HDMI) connector, a Video Graphics Array (VGA) connector, a Universal Serial Bus™(USB) connector, a tip, ring, sleeve (TRS) connector, and/or any other suitable connector operable to couple the local computing devices 115, 120 to the output.

The remote computing device 140 may be a computing entity operable to enable a remote user to control the operation of the legacy irrigation system via irrigation control bypass module 155. The remote computing device 140 may be functionally and/or structurally similar to the local computing devices 115, 120 and may be operable to receive data streams from and/or send signals to irrigation control bypass module 155 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 135.

In some embodiments, the one or more sensor units 110 may be sensors configured to conduct periodic or ongoing automatic measurements related to irrigation system operation. Each sensor unit 110 may be capable of sensing multiple environmental parameters, or alternatively, separate sensor units 110 may monitor separate environmental parameters. For example, one sensor unit 110 may measure humidity, while another sensor unit 110 (or, in some embodiments, the same sensor unit 110) may detect light or temperature. Other monitored environmental data may include moisture. In alternate embodiments, a user may input environmental data directly at the local computing device 115, 120 or at remote computing device 140. For example, a user may input at a dedicated application on his smartphone that it is currently raining, such that irrigation is not currently required, and accordingly any scheduled irrigation may be temporarily bypassed.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smartphone. Where local computing device 115, 120 is a smartphone, the smartphone may have a dedicated application directed to collecting environmental data and deriving irrigation instructions therefrom. The local computing device 115, 120 may process the data received from the one or more sensor units 110 to obtain irrigation instructions. In alternate embodiments, remote computing device 140 may process the data received from the one or more sensor units 110, via network 125 and server 135, to obtain irrigation instructions. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 130 via network 125 and server 135.

Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 135 may be configured to communicate with irrigation control bypass module 155, one or more sensor units 110, the local computing devices 115, 120, the remote computing device 140, and control panel 130. The server 135 may perform additional processing on signals received from the sensor units 110 or local computing devices 115, 120, or may simply forward the received information to the remote computing device 140 and control panel 130. Server 135 may also communicate irrigation instructions from control panel 130 and/or local computing devices 115, 120 to irrigation control bypass module 155.

Server 135 may be a computing device operable to receive data streams (e.g., from sensor units 110 and/or local computing device 115, 120 or remote computing device 140), store and/or process data, and/or transmit data and/or data summaries (e.g., to remote computing device 140 or irrigation control bypass module 155). For example, server 135 may receive a stream of environmental data from a sensor unit 110, and may receive irrigation operation instructions from control panel 130. In some embodiments, server 135 may "pull" the data streams, e.g., by querying the sensor units 110, the local computing devices 115, 120, and/or the control panel 130. In some embodiments, the data streams may be "pushed" from the sensor units 110 and/or the local computing devices 115, 120 to the server 135, and on to irrigation control bypass module 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 135 may include a database (e.g., in memory) containing irrigation system and/or environmental data received from the sensor units 110, control panel 130, and/or the local computing devices 115, 120. Additionally, as described in further detail herein, software (e.g., stored in memory) may be executed on a processor of the server 135. Such software (executed on the processor) may be operable to cause the server 135 to monitor, process, summarize, present, and/or send a signal associated with the irrigation system.

Figure 2:
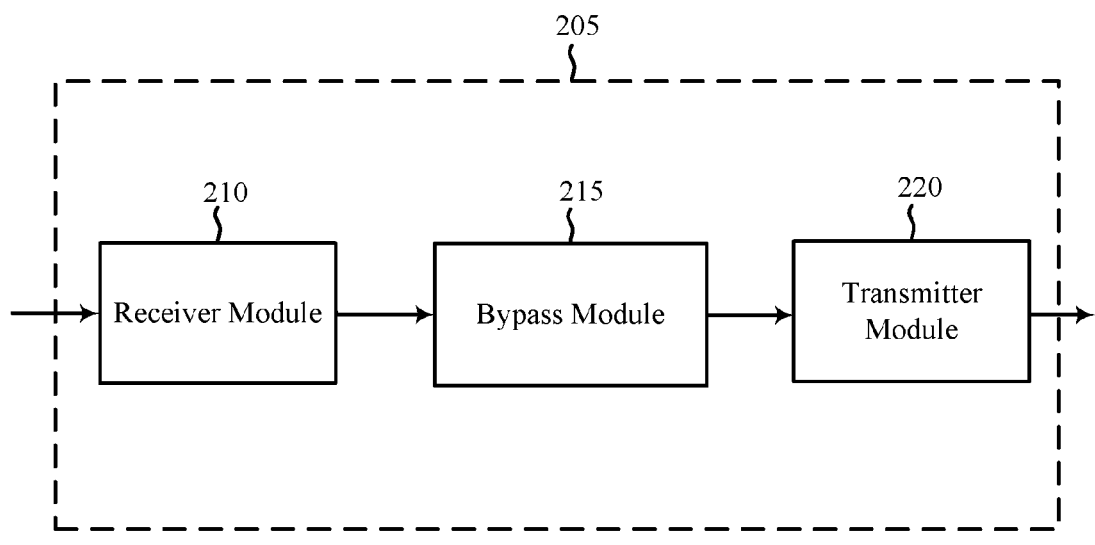
FIG. 2 shows a block diagram of a device relating to an automation system, in accordance with various aspects of this disclosure.
Figure 2:

FIG. 2 shows a block diagram 200 of an apparatus 205 for use in electronic communication, in accordance with various aspects of this disclosure. The apparatus 205 may be an example of one or more aspects of any of a control panel 130, local computing device 115, 120, or remote computing device 140 described with reference to FIG. 1, or may alternatively be an example of one or more aspects of the irrigation control bypass module 155, described with reference to FIG. 1. The apparatus 205 may include a receiver module 210, a bypass module 215, and/or a transmitter module 220. The apparatus 205 may also be or include a processor. Each of these modules may be in communication with each other, directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, data, and/or control information associated with various information channels (e.g., control channels, data channels, etc.). The receiver module 210 may be configured to receive environmental data from one or more sensor units 110 as discussed with respect to FIG. 1, and/or may be configured to receive irrigation scheduling data from any of direct user input, for example at a control panel 130 (as discussed with respect to FIG. 1) or dedicated application on a smartphone or personal computing device; or from instructions received from any of a local computing device 115, 120 or remote computing device 140 as discussed with respect to FIG. 1; or a combination thereof. In some embodiments, apparatus 205 may be an example of a control panel 130, as discussed with respect to FIG. 1, and may accordingly receive environmental data and/or irrigation scheduling data via receiver module 210 from one or more remotely situated sensor units, from direct user input at an interactive display on apparatus 205, and/or from signals received from a local or remote computing device. In other embodiments, apparatus 205 may be an example of a local computing device, such as a smartphone or personal computing device. In this example, apparatus 205 may receive environmental data and/or irrigation scheduling data via receiver module 210 from one or more remotely situation sensor units, from direct user input at the apparatus 205, for example on a dedicated application, and/or from signals received from a remote computing device and/or control panel. Information may be passed on to the bypass module 215, and to other components of the apparatus 205.

Bypass module 215 may be configured to derive operating instructions for the legacy irrigation system, such that the legacy irrigation system may be remotely operated, and may bypass any operation instructions received from the legacy irrigation system control panel. In some examples, bypass module 215 may derive operating instructions based on environmental data received from one or more sensor units. For example, bypass module 215 may receive data via receiver module 210 indicating that the ground moisture levels are sufficiently elevated (for example based on predetermined moisture thresholds) such that additional watering is not needed. Based on this received data, bypass module 215 may derive an instruction to skip the watering cycle scheduled for that day. Bypass module 215 may communicate this instruction to transmitter module 220, which may pass that instruction on to irrigation control bypass module 155, as described with respect to FIG. 1. In another example, bypass module 215 may receive user inputted irrigation instructions from receiver module 210. In still other examples, bypass module 215 may derive operation instructions based on a combination of environmental data and user inputted instructions. For example, a user may input a watering schedule to operate the system Mondays, Wednesdays, and Fridays, with the caveat that the system should not operate if the ground moisture level is above a certain threshold (either inputted by the user or drawn from other, for example online, sources). Accordingly, bypass module 215 may derive operation instructions based on a combination of environmental data and user inputted instructions to determine appropriate system operation based on all surrounding circumstances.

Where apparatus 205 is a control panel associated with the home automation system, the user may have inputted instructions directly at the user interface of the control panel, and the input may have been received directly by receiver module 210. The inputted instructions may indicate a preferred irrigation system operating status, such as activating or deactivating sprinklers in one or more zones, or may indicate a preferred irrigation system operating schedule, such as activating the system on Mondays, Wednesdays, and Fridays, or the like. Bypass module 215 may receive these operating instructions from receiver module 210, and may communicate the operating instructions, via transmitter module 220, to the irrigation control bypass module, as described with respect to FIG. 1. The irrigation control bypass module may accordingly initiate the received instructions at the legacy irrigation automation system.

In other examples, where apparatus 205 is an example of one or more components of an irrigation control bypass module, as described with respect to FIG. 1, receiver module 210 may receive environmental and/or irrigation operation instruction data from any one or more of a sensor unit, local computing device, control panel, or remote computing device. Receiver module 210 may communicate this environmental and/or irrigation operation instruction data to bypass module 215, which may derive an operation instruction for implementation directly by the irrigation control bypass module. This operation instruction may then by implemented by transmitter module 220, to control operation of the legacy irrigation automation system. In some examples, the transmitter module 220 may be collocated with the receiver module 210 in a transceiver module.

Figure 3:
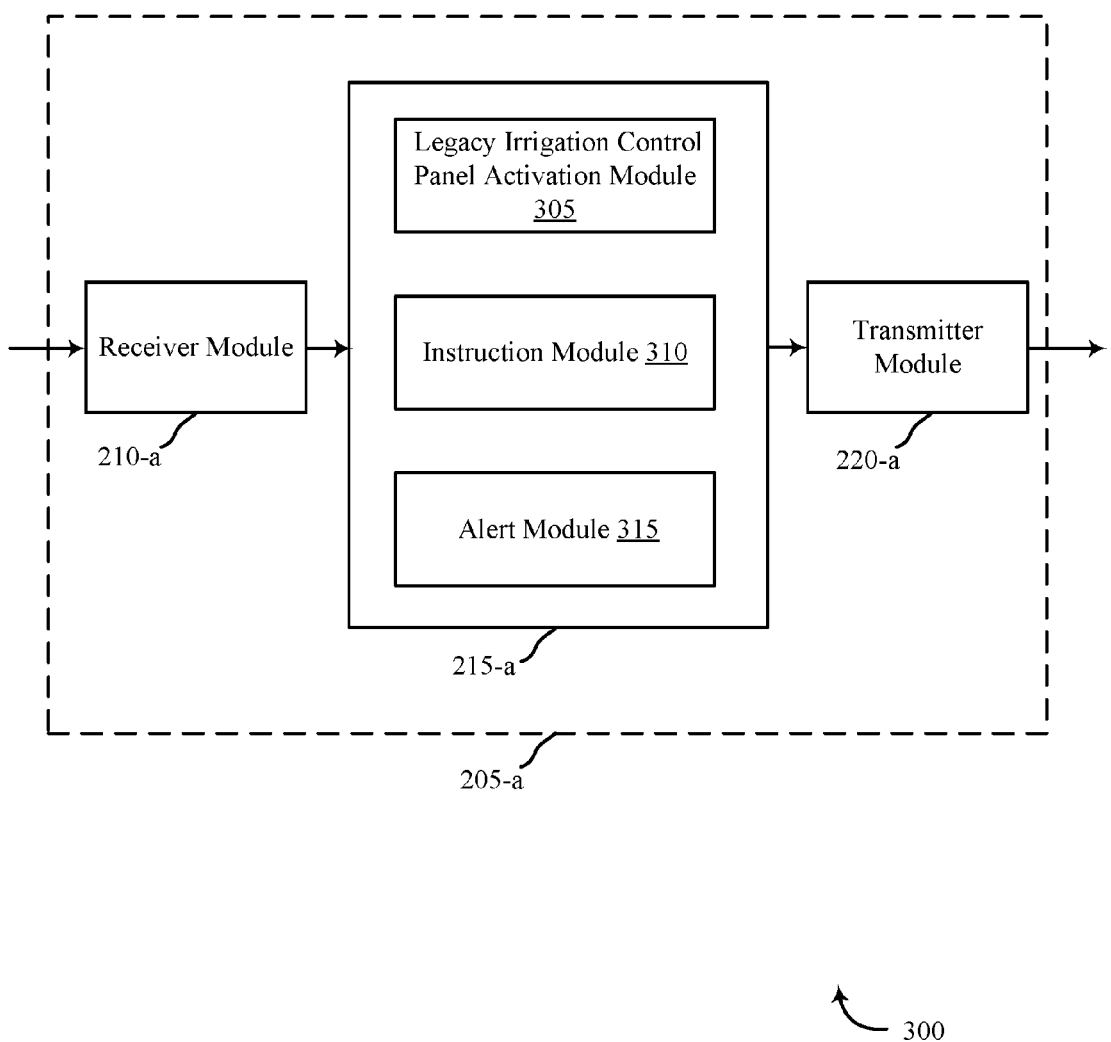
FIG. 3 shows a block diagram of a device relating to an automation system, in accordance with various aspects of this disclosure.

FIG. 3 shows a block diagram 300 of an apparatus 205-a for use in controlling a legacy irrigation automation system, in accordance with various examples. The apparatus 205-a may be an example of one or more aspects of any of a control panel 130, local computing device 115, 120, or remote computing device 140 described with reference to FIG. 1, or may alternatively be an example of one or more aspects of the irrigation control bypass module 155, described with reference to FIG. 1. Apparatus 205-a may also be an example of an apparatus 205 described with reference to FIG. 2. The apparatus 205-a may include a receiver module 210-a, a bypass module 215-a, and/or a transmitter module 220-a, which may be examples of the corresponding modules of apparatus 205. The apparatus 205-a may also include a processor. Each of these components may be in communication with each other. The bypass module 215-a may include any one or more of a legacy irrigation control panel activation module 305, an instruction module 310, and an alert module 315. The receiver module 210-a and the transmitter module 220-a may perform the functions of the receiver module 210 and the transmitter module 220, of FIG. 2, respectively.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Legacy irrigation control panel activation module 305 may be configured to allow for operation of the legacy irrigation automation system using the original, legacy irrigation control panel 150 (as described with respect to FIG. 1) associated with that system. For example, legacy irrigation control panel 150 may have been programmed, either by a user or factory programming, or automatically based on received environmental data, to operate the irrigation automation system on a regular schedule, each Monday, Wednesday, and Friday, between 9-10 AM. In some examples, receiver module 210-a may not have received additional irrigation system operation data, either in the form environmental data from one or more sensors, or as irrigation system operation instructions inputted by a user. In the absence of these instructions or data, legacy irrigation control panel activation module 305 may be configured to activate the legacy irrigation control panel 150 of FIG. 1 in order to allow the legacy irrigation automation system to operate according to the instructions programmed into legacy irrigation control panel 150. In this way, normal operation of the legacy irrigation automation system may be maintained, even where a user fails to provide alternate instructions, or where no additional environmental data prompts a change in the irrigation schedule.

Instruction module 310 may be operable, as discussed above with respect to FIG. 2, to derive operating instructions for the legacy irrigation automation system based at least in part on environmental data and/or user inputted instructions received by receiver module 210-a. For example, instruction module 310 may receive user input via receiver module 210-a, where the received user input may include preferences for a weekly watering schedule. Instruction module 310 may derive an operation instruction based on this received schedule, and may communicate the operation instruction to the irrigation control bypass module, via transmitter module 220-a, to be carried out by the legacy irrigation automation system.

Alert module 315 may be configured to derive an alert where, for example, legacy irrigation control panel activation module 305 has allowed the legacy irrigation control panel to be in an active, operable state. As discussed above, legacy irrigation control panel activation module 305 may allow for the legacy irrigation control panel to operate in an active state, in some examples due to a lack of instructions from a user or a lack of received environmental data. When in an active state, the legacy irrigation control panel may actively operate the legacy irrigation automation system, either with or without additional input from the irrigation control bypass module. In other words, in various embodiments, the irrigation control bypass module may actively operate the legacy irrigation automation system individually; the irrigation control bypass module and the legacy irrigation control panel may operate the legacy irrigation automation system together or alternately; or the legacy irrigation control panel may operate the legacy irrigation automation system individually. Accordingly, where legacy irrigation control panel activation module 305 has allowed the legacy irrigation control panel to operate in an active state, alert module 315 may derive an alert to be communicated to the user to alert the user of the legacy irrigation control panel's active state. Conversely, alert module 315 may also be configured to derive an alert to be communicated to the user via transmitter module 220-a when the legacy irrigation control panel has entered an inactive state. In other embodiments, alert module 315 may derive alerts associated with other status of the irrigation control bypass module, legacy irrigation control panel, and/or legacy irrigation automation system, such as operation status, battery or power status, or other information associated with the system operations.

As discussed above with respect to FIG. 2, transmitter module 220-a may transmit alerts from bypass module 215-a to the user, for example at a control panel associated with the home automation system, and/or at a local computing device, such as a personal computer, smartphone, or the like, associated with the user in some examples. The communicated alerts may take any acceptable form, including visual, audio, and/or haptic alerts, among others. In other examples, transmitter module 220-a may communicate operation instructions from bypass module 215-a to any of the legacy irrigation control panel, the irrigation control bypass module, a control panel associated with the home automation system, and/or a local or remote computing device.

Figure 4:
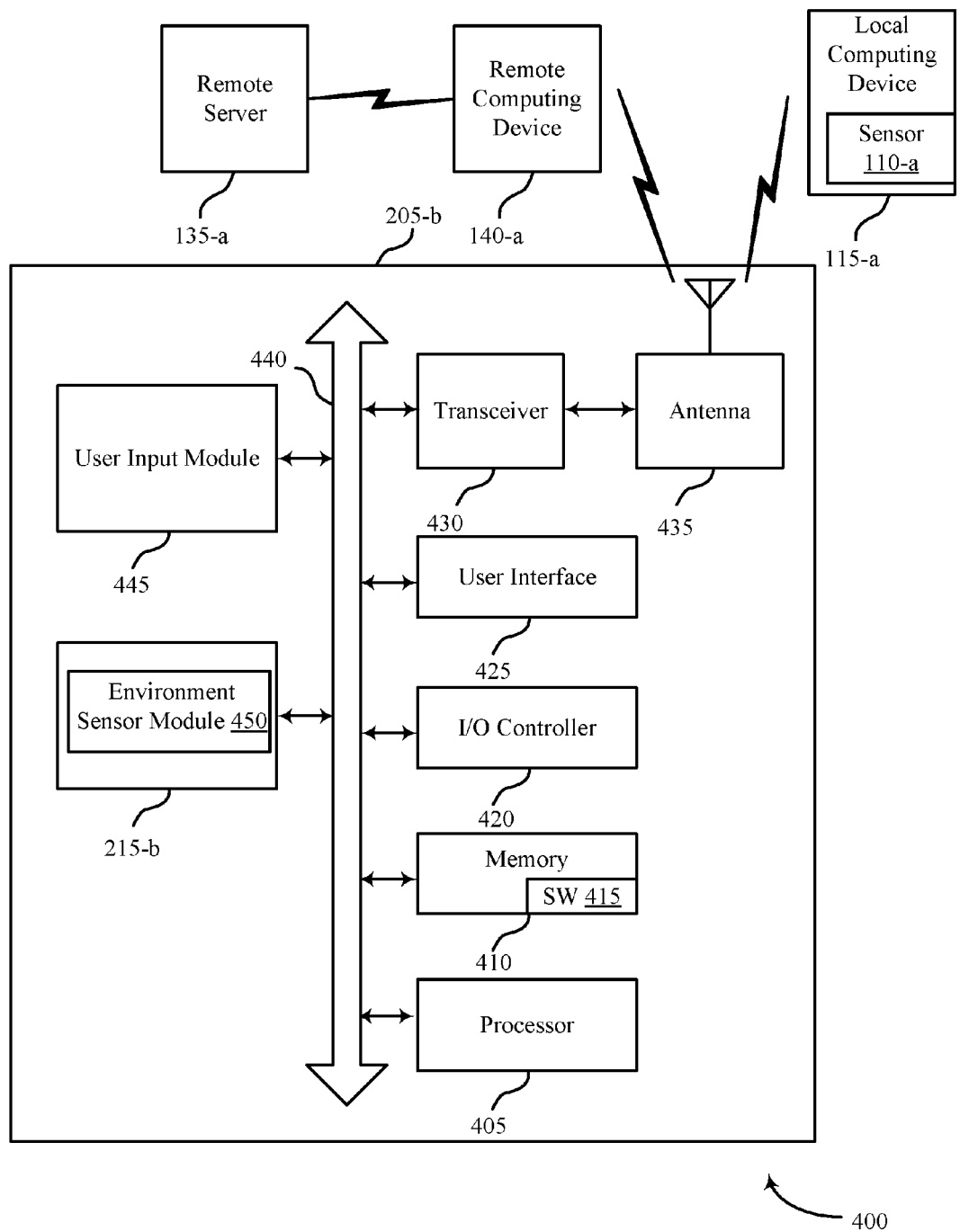
FIG. 4 shows a block diagram relating to an automation system, in accordance with various aspects of this disclosure.

FIG. 4 shows a system 400 for use in remote irrigation operation systems, in accordance with various examples. System 400 may include an apparatus 205-b, which may be an example of one or more aspects of any of a control panel 130, local computing device 115, 120, or remote computing device 140 described with reference to FIG. 1, or may alternatively be an example of one or more aspects of the irrigation control bypass module 155, described with reference to FIG. 1. Apparatus 205-b may also be an example of one or more aspects of apparatus 205 and/or 205-a of FIGS. 2 and 3.

Apparatus 205-b may include components for bi-directional voice and data communications including components for transmitting communications and components for receiving communications. For example, apparatus 205-b may communicate bi-directionally with one or more of local computing device 115-a, one or more sensors 110-a, remote computing device 14-a, and/or remote server 135-a, which may be an example of the remote server 135 of FIG. 1. This bi-directional communication may be direct (e.g., apparatus 205-b communicating directly with remote computing device 140-a) or indirect (e.g., apparatus 205-b communicating indirectly with remote server 135-a through remote computing device 140-a).

Apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of local computing device 115-a, remote computing device 140-a, and/or remote server 135-a. The transceiver module 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel or the control device may also have multiple antennas 435 capable of concurrently transmitting or receiving multiple wired and/or wireless transmissions. In some embodiments, one element of apparatus 205-b(e.g., one or more antennas 435, transceiver module 430, etc.) may provide a direct connection to a remote server 135-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 110-a (e.g., moisture, humidity, time of day, time of year, light, etc.) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through input/output controller module 420).

One or more buses 440 may allow data communication between one or more elements of apparatus 205-b (e.g., processor module 405, memory 410, input/output controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., derive legacy irrigation automation system operation instructions, update legacy irrigation control panel operation status, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems may be interconnected in different ways from that shown in FIG. 4. In some embodiments, an aspect of some operation of a system, such as that shown in FIG. 4, may be readily known in the art and are not discussed in detail in this application. Code to implement the present disclosure may be stored in a non-transitory computer-readable medium such as one or more of system memory 410 or other memory. The operating system provided on input/output controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus 205-b may include a single antenna 435, the apparatus 205-b may have multiple antennas 435 capable of concurrently transmitting and/or receiving multiple wireless transmissions.

The apparatus 205-b may include a bypass module 215-b, which may perform the functions described above for the bypass modules 215, 215-a of apparatus 205 of FIGS. 2 and 3.

Figure 5:
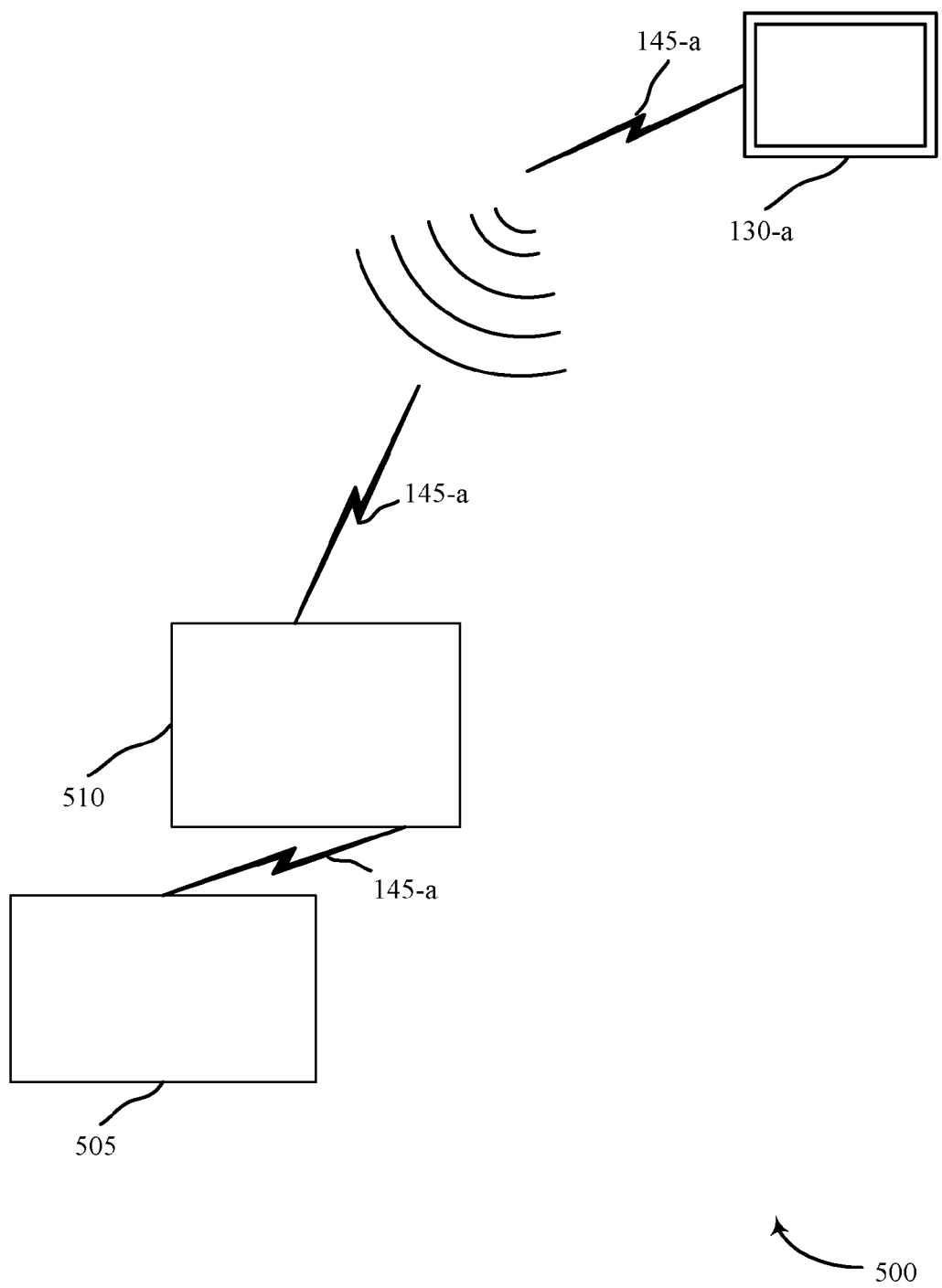
FIG. 5 shows a block diagram relating to an automation system, in accordance with various aspects of this disclosure.

FIG. 5 is a flow chart illustrating an example of a method 500 for providing remote irrigation system operation, in accordance with various aspects of the present disclosure. For clarity, the method 500 is described below with reference to one or more aspects of any of a control panel 130, local computing device 115, 120, or remote computing device 140 described with reference to FIG. 1, or may alternatively one or more aspects of the irrigation control bypass module 155, described with reference to FIG. 1. In some examples, a control panel associated with the home automation system and/or an irrigation control bypass module may execute one or more sets of codes to control the functional elements of the legacy irrigation automation system to perform the functions described below. Additionally or alternatively, the control panel may perform one or more of the functions described below using special-purpose hardware.

At block 505, the method 500 may include coupling an irrigation control bypass module with a legacy irrigation control panel associated with a legacy irrigation automation system. As discussed above with respect to FIG. 1, legacy irrigation control panel may be an analog control panel in some embodiments, or may be a digital control panel in other embodiments. The legacy irrigation control panel may be configured to operate one or more irrigation zones associated with the legacy irrigation automation system, for example for a home or business. Irrigation control bypass module may be coupled with the legacy irrigation control panel, by wired or wireless means, or a combination thereof. For example, coupling the irrigation control bypass module with the legacy irrigation control panel may include coupling a wire harness associated with the irrigation control bypass module with one or more irrigation zone wires associated with the legacy irrigation control panel. In this way, irrigation control bypass module may take control of the legacy irrigation automation system by bypassing control by the legacy irrigation control panel. In other embodiments, irrigation control bypass module may be coupled with the legacy irrigation control panel using wireless means, such as utilizing a Wi-Fi or Bluetooth signal, or the like, to control the legacy irrigation automation system.

At block 510, the method 500 may include setting the legacy irrigation control panel to an inactive state. As previously discussed, legacy irrigation control panel may be configured to control the operation of the legacy irrigation automation system. In order to avoid redundant or conflicting operation instructions, the legacy irrigation control panel may be set to an inactive state so that the irrigation control bypass module may instead have full control over operation of the legacy irrigation automation system.

At block 515, the method 500 may include operating the legacy irrigation automation system based at least in part on a first set of one or more instructions received from the irrigation control bypass module, wherein the irrigation control bypass module is initiated based at least in part on a second set of one or more instructions received from the home automation system. As previously discussed with respect to FIG. 2, in some examples, the second set of one or more instructions received from the home automation system may be derived based on user input. For example, a user may input at a control panel associated with the home automation system, or at a dedicated application on his smartphone, or the like, preferences regarding a watering schedule for his lawn. Based on these inputted instructions, the home automation system may derive one or more instructions for irrigation system operation, and may communicate these instructions to the irrigation control bypass module to be executed by the legacy irrigation automation system. In other examples, the second set of one or more instructions received from the home automation system may be derived based on environmental data received from one or more sensor units. For example, a soil moisture sensor may detect that the soil in the user's yard has exceeded a predetermined moisture threshold (based, for example, on threshold parameters inputted by the user, or by threshold parameters drawn from a public source, such as an Internet source, or the like), and that a watering cycle is not required. Based on this moisture data, the home automation system may derive an instruction to bypass a scheduled watering cycle, and may communicate that instruction to the irrigation control bypass module, to be carried out by the legacy irrigation automation system. In still other examples, the home automation system may derive the second set of one or more instructions based on a combination of user inputted preferences and received environmental data.

Thus, the method 500 may provide for remote system operation and override for existing irrigation systems. It should be noted that the method 500 is just one implementation and that the operations of the method 500 may be rearranged or otherwise modified such that other implementations are possible.

Figure 6:
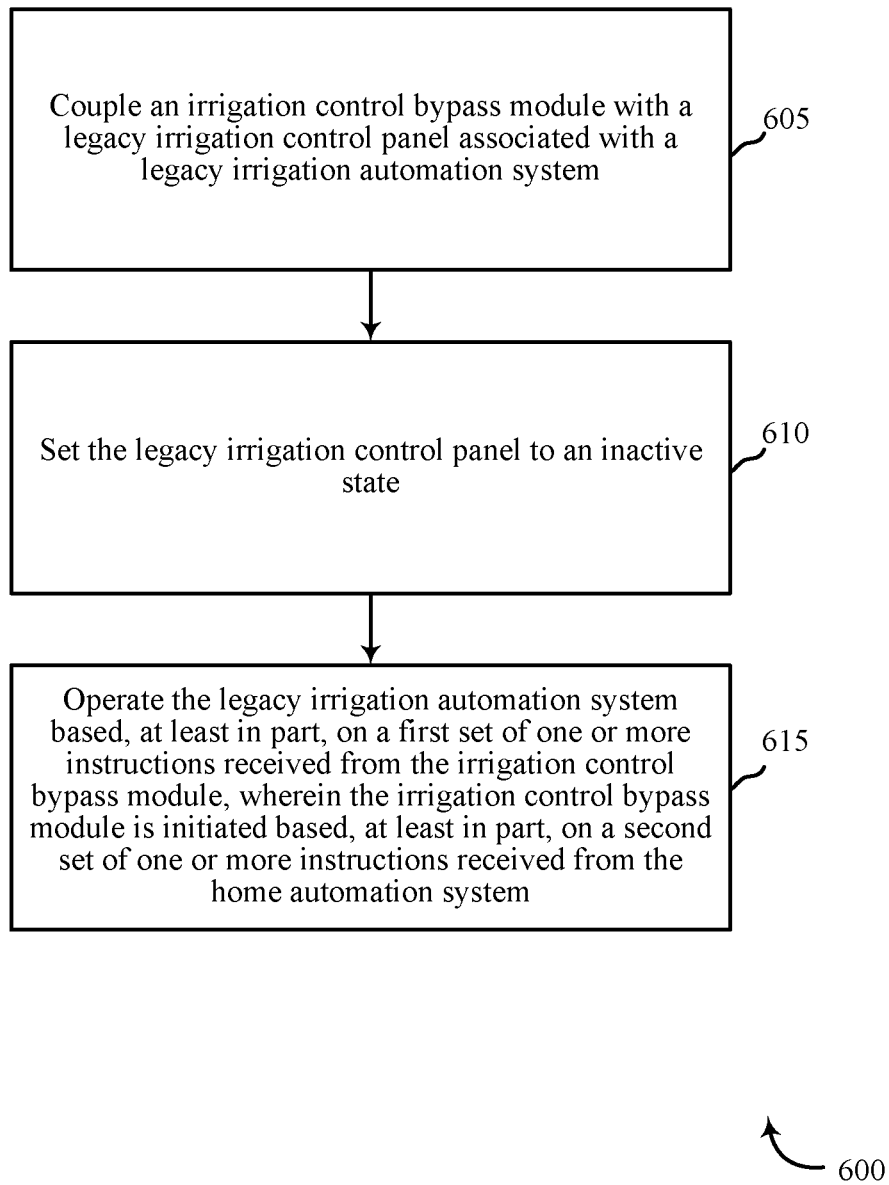
FIG. 6 is a flow chart illustrating an example of a method relating to an automation system, in accordance with various aspects of this disclosure.
Figure 7:
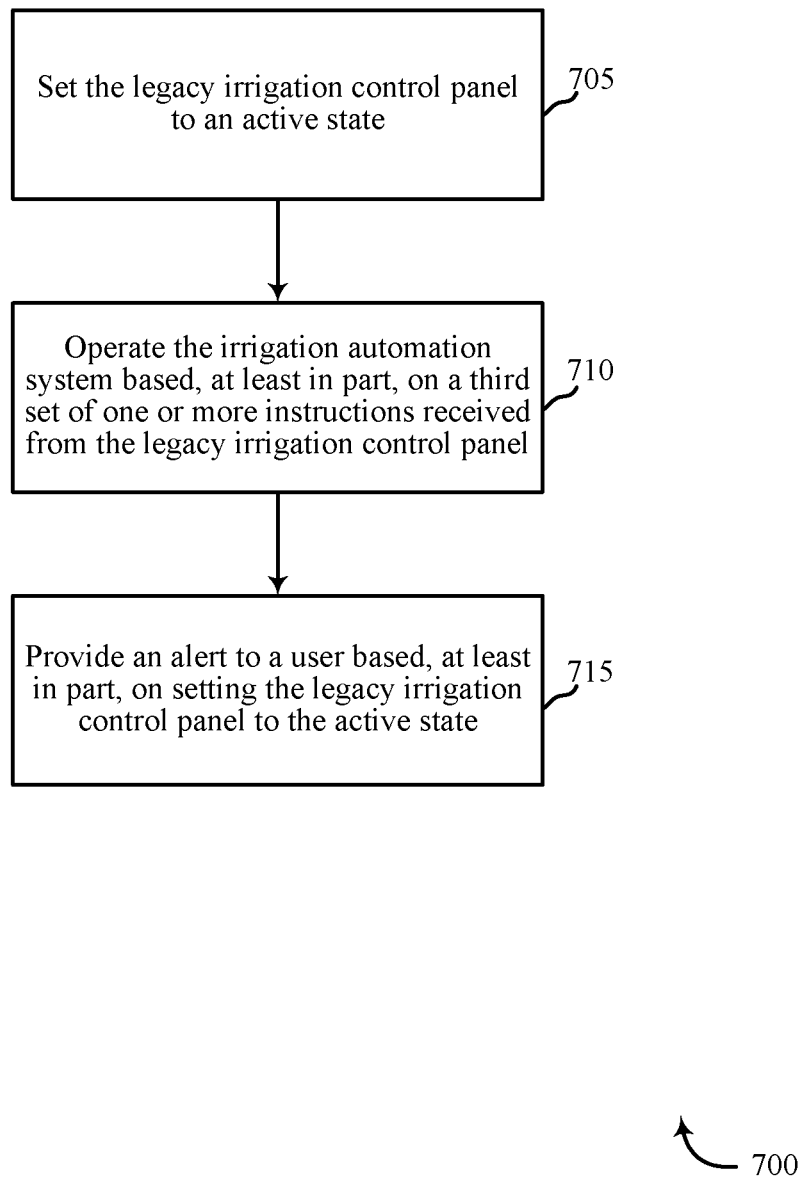
FIG. 7 is a flow chart illustrating an example of a method relating to an automation system, in accordance with various aspects of this disclosure.

FIG. 6 is a flow chart illustrating an example of a method 600 for providing remote irrigation system operation, in accordance with various aspects of the present disclosure. For clarity, the method 600 is described below with reference to one or more aspects of any of a control panel 130, local computing device 115, 120, or remote computing device 140 described with reference to FIG. 1, or may alternatively one or more aspects of the irrigation control bypass module 155, described with reference to FIG. 1. In some examples, a control panel associated with the home automation system and/or an irrigation control bypass module may execute one or more sets of codes to control the functional elements of the legacy irrigation automation system to perform the functions described below. Additionally or alternatively, the control panel may perform one or more of the functions described below using special-purpose hardware.

At block 605, the method 600 may include setting the legacy irrigation control panel to an active state. As discussed above, in various embodiments the irrigation control bypass module and the legacy irrigation control panel may operate concurrently, alternately, or may operate independently while one is active and the other is inactive. At block 605, the legacy irrigation control panel may be in an active state, such that the legacy irrigation control panel may be operable to control irrigation operations of the legacy irrigation automation system.

At block 610, the method 600 may include operating the legacy irrigation automation system based at least in part on a third set of one or more instructions received from the legacy irrigation control panel. Thus, the legacy irrigation control panel may be permitted to control the legacy irrigation automation system either independently from the irrigation control bypass module, or in addition to the control of the irrigation control bypass module. In one example, a user may not have inputted an irrigation operation preference, and no environmental data may have been received in order to permit the home automation system to derive an operation instruction for communication to the irrigation control bypass module and execution by the legacy irrigation automation system. In the absence of this instruction, the legacy irrigation control panel may provide a third set of one or more instructions to the legacy irrigation automation system for operation.

At block 615, the method 600 may include providing an alert to a user based at least in part on setting the legacy irrigation control panel to the active state. The alert may be communicated to the user at a control panel associated with the home automation system, for example in the form of a visual or audio alert in some examples, or in other examples, the alert may be communicated to the user in the form of a haptic alert at the user's smartphone or personal computing device. Other forms of alerts are also envisioned. In any embodiment, the alert may notify the user that the legacy irrigation automation system is being operated based on instructions received from the legacy irrigation control panel, so that the user may decide whether to override these instructions with the irrigation control bypass module, or may instead allow the legacy irrigation control panel to continue operating the legacy irrigation automation system.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, flash memory, CD-ROM, DVD, or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and may be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a home automation system, comprising:
coupling an irrigation control bypass module with a legacy irrigation control panel associated with a legacy irrigation automation system;
setting the legacy irrigation control panel to an inactive state; and
operating the legacy irrigation automation system based at least in part on a first set of one or more instructions received from the irrigation control bypass module, wherein the irrigation control bypass module is initiated based at least in part on a second set of one or more instructions received from the home automation system.

2. The method of claim 1, further comprising:
setting the legacy irrigation control panel to an active state; and
operating the legacy irrigation automation system based at least in part on a third set of one or more instructions received from the legacy irrigation control panel.

3. The method of claim 2, further comprising:
providing an alert to a user based at least in part on setting the legacy irrigation control panel to the active state.

4. The method of claim 3, wherein the alert comprises any of an auditory alert, a visual alert, or a haptic alert, or a combination thereof.

5. The method of claim 1, wherein the second set of one or more instructions received from the home automation system are derived based at least in part on any of a user input at the home automation system, or data received from one or more sensors associated with the home automation system, or a combination thereof.

6. The method of claim 5, further comprising:
comparing the data received from the one or more sensors with one or more predetermined thresholds; and
deriving the second set of one or more instructions based at least in part on the comparing.

7. The method of claim 5, wherein the home automation system is coupled with the irrigation control bypass module with a wireless connection.

8. The method of claim 5, wherein the one or more sensors comprise any of a temperature sensor, a humidity sensor, a moisture sensor, or a light sensor, or a combination thereof.

9. The method of claim 1, wherein coupling the irrigation control bypass module with the legacy irrigation control panel associated with the legacy irrigation automation system comprises coupling a wire harness associated with the irrigation control bypass module with one or more irrigation zone wires associated with the legacy irrigation control panel.

10. An apparatus for a home automation system, comprising:
a processor;
memory in electronic communication with the processor; and
processor instructions stored in the memory, the processor instructions being executable by the processor to:
set a legacy irrigation control panel associated with a legacy irrigation automation system to an inactive state; and
operate the legacy irrigation automation system based at least in part on a first set of one or more instructions received from an irrigation control bypass module, wherein the irrigation control bypass module is coupled with the legacy irrigation control panel, and wherein the irrigation control bypass module is initiated based at least in part on a second set of one or more instructions received from the home automation system.

11. The apparatus of claim 10, wherein the processor instructions are further executable by the processor to:
set the legacy irrigation control panel to an active state; and
operate the legacy irrigation automation system based at least in part on a third set of one or more instructions received from the legacy irrigation control panel.

12. The apparatus of claim 10, wherein the processor instructions are further executable by the processor to:
provide an alert to a user based at least in part on setting the legacy irrigation control panel to the active state.

13. The apparatus of claim 12, wherein the alert comprises any of an auditory alert, a visual alert, or a haptic alert, or a combination thereof.

14. The apparatus of claim 10, further comprising:
one or more sensors associated with the home automation system.

15. The apparatus of claim 14, wherein the second set of one or more instructions received from the home automation system are derived based at least in part on any of a user input at the home automation system, or data received from one or more sensors associated with the home automation system, or a combination thereof.

16. The apparatus of claim 15, wherein the processor instructions are further executable by the processor to:
compare the data received from the one or more sensors with one or more predetermined thresholds; and
derive the second set of one or more instructions based at least in part on the comparing.

17. The apparatus of claim 15, wherein the home automation system is coupled with the irrigation control bypass module with a wireless connection.

18. The apparatus of claim 15, wherein the one or more sensors comprise any of a temperature sensor, a humidity sensor, a moisture sensor, or a light sensor, or a combination thereof.

19. The apparatus of claim 10, wherein a wire harness associated with the irrigation control bypass module is coupled with one or more irrigation zone wires associated with the legacy irrigation control panel.

20. A non-transitory computer-readable medium storing computer-executable code, the code executable by a processor to:
set a legacy irrigation control panel associated with a legacy irrigation automation system to an inactive state; and
operate the legacy irrigation automation system based at least in part on a first set of one or more instructions received from an irrigation control bypass module, wherein the irrigation control bypass module is coupled with the legacy irrigation control panel, and wherein the irrigation control bypass module is initiated based at least in part on a second set of one or more instructions received from the home automation system.

* * * * *